(12) United States Patent
Schulte et al.

(10) Patent No.: US 11,892,283 B2
(45) Date of Patent: Feb. 6, 2024

(54) MEASURING APPARATUS FOR INTERFEROMETRICALLY DETERMINING A SURFACE SHAPE

(71) Applicant: Carl Zeiss SMT GmbH, Oberkochen (DE)

(72) Inventors: Stefan Schulte, Stoedlen (DE); Rolf Freimann, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 0 days.

(21) Appl. No.: 17/708,409

(22) Filed: Mar. 30, 2022

(65) Prior Publication Data
US 2022/0221269 A1  Jul. 14, 2022

Related U.S. Application Data

(63) Continuation of application No. PCT/EP2020/076557, filed on Sep. 23, 2020.

(30) Foreign Application Priority Data

Sep. 30, 2019 (DE) ..................... 10 2019 214 979.0

(51) Int. Cl.
*G01B 11/24* (2006.01)
*G01B 9/02* (2022.01)
(Continued)

(52) U.S. Cl.
CPC ...... *G01B 11/2441* (2013.01); *G01B 9/02039* (2013.01); *G01B 9/02072* (2013.04);
(Continued)

(58) Field of Classification Search
CPC ............ G01B 9/02039; G01B 9/02072; G01B 11/2441; G01M 11/005; G01M 11/0271
See application file for complete search history.

(56) References Cited

U.S. PATENT DOCUMENTS

| 8,194,230 B2 | 6/2012 | Chan et al. |
| 8,345,262 B2 | 1/2013 | Schillke et al. |

(Continued)

FOREIGN PATENT DOCUMENTS

| DE | 102006035022 A1 | 1/2008 | |
| DE | 102009018020 A1 * | 12/2009 | ........ G01M 11/0264 |

(Continued)

OTHER PUBLICATIONS

International Search Report, PCT/EP2020/076557, dated Dec. 17, 2020, 10 pages.

(Continued)

*Primary Examiner* — Michael A Lyons
(74) *Attorney, Agent, or Firm* — Edell, Shapiro & Finnan, LLC (57) ABSTRACT

A measurement apparatus (10) for interferometrically determining a surface shape of a test object (14). A radiation source provides an input wave (42), a multiply-encoded diffractive optical element (60), which is configured to produce by diffraction from the input wave a test wave (66) that is directed at the test object and has a wavefront in the form of a free-form surface and at least one calibration wave (70), and a capture device (46). The calibration wave has a wavefront with a non-rotationally symmetric shape (68*f*), wherein cross sections through the wavefront of the calibration wave along cross-sectional surfaces each aligned transversely to one another have a curved shape. The curved shapes in the different cross-sectional surfaces differ in terms of an opening parameter. The capture device (46) captures a calibration interferogram formed by superimposing a reference wave (40) with the calibration wave after interaction with a calibration object (74).

11 Claims, 7 Drawing Sheets

(51) Int. Cl.
  *G01M 11/00* (2006.01)
  *G01B 9/02055* (2022.01)
  *G01M 11/02* (2006.01)
  *G02B 5/08* (2006.01)

(52) U.S. Cl.
  CPC ...... *G01M 11/005* (2013.01); *G01M 11/0271* (2013.01); *G02B 5/0891* (2013.01)

(56) References Cited

U.S. PATENT DOCUMENTS

| | | |
|---|---|---|
| 2006/0274325 A1 | 12/2006 | Hetzler et al. |
| 2009/0128829 A1* | 5/2009 | Schillke ............ G01B 9/02039 356/521 |
| 2010/0177321 A1* | 7/2010 | Hetzler ............ G01B 9/02039 356/512 |
| 2012/0127481 A1 | 5/2012 | Schillke et al. |
| 2014/0313517 A1* | 10/2014 | Vankerkhove ....... G01M 11/005 356/512 |
| 2015/0198438 A1 | 7/2015 | Hetzler |
| 2016/0085061 A1 | 3/2016 | Schwab |
| 2016/0298951 A1 | 10/2016 | Schulte et al. |
| 2018/0106591 A1 | 4/2018 | Hetzler et al. |
| 2018/0252904 A1 | 9/2018 | Wolf et al. |
| 2019/0271532 A1 | 9/2019 | Schulte et al. |
| 2020/0225028 A1 | 7/2020 | Hetzler et al. |

FOREIGN PATENT DOCUMENTS

| | | |
|---|---|---|
| DE | 102012217800 A1 | 4/2014 |
| DE | 102013226668 A1 | 6/2015 |
| DE | 102015209490 A1 | 11/2016 |
| DE | 102016224236 A1 | 1/2017 |
| DE | 102017217369 A1 | 4/2019 |
| WO | 2017080937 A1 | 5/2017 |

OTHER PUBLICATIONS

Pruss et al., "Advances in 3D asphere testing and reconstruction", SPIE, vol. 7320, May 6, 2009, 10 pages.
Mallik et al., "Absolute calibration of null correctors using dual computer-generated holograms", SPIE, vol. 6721, Nov. 21, 2007, 16 pages.
Hall, "Freeform metrology using subaperture stitching interferometry", QED Technologies, APOMA, Nov. 10-11, 2016, 18 pages.
German Office Action with English translation, Application No. 102019214979.0, dated Aug. 12, 2020, 10 pages.
Supranowitz et al., "Fabrication and metrology of high-precision freeform surfaces", Proc. SPIE vol. 8884 (2013), 11 pages.
Khan, "Improved Combined Diffractive Optical Elements for quasi absolute testing of Aspherics", DGaO Proceedings 2006, 2 pages.
International Preliminary Report on Patentability, PCT/EPO2020/076557, dated Apr. 5, 2022, 19 pages.

* cited by examiner

MEASURING APPARATUS FOR INTERFEROMETRICALLY DETERMINING A SURFACE SHAPE

CROSS REFERENCE TO RELATED APPLICATIONS

This is a Continuation of International Application PCT/EP2020/076557 which has an international filing date of Sep. 23, 2020, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2019 214 979.0 filed on Sep. 30, 2019.

FIELD OF THE INVENTION

The invention relates to a measurement apparatus for interferometrically determining a shape of a surface of a test object, to a method for calibrating a diffractive optical element, to a method for interferometrically determining a shape of a surface of a test object, and to an optical element for a projection lens of a microlithographic exposure apparatus.

BACKGROUND

For the highly accurate interferometric measurement of a surface shape of a test object, such as a microlithographic optical element, diffractive optical arrangements are often used as what are known as zero optics. In this case, the wavefront of a test wave is adapted by way of a diffractive element to a desired (i.e., predetermined) shape of the surface in such a way that the individual rays of the test wave would be incident on the desired shape in perpendicular fashion at every location and be reflected back on themselves thereby. Deviations from the desired shape can be determined by the superposition of a reference wave on the reflected test wave. The diffractive element used can be a computer-generated hologram (CGH), for example.

The accuracy of the shape measurement depends on the accuracy of the CGH. The decisive factor here is not necessarily the most exact possible production of the CGH, but rather a most exact measurement of all possible errors in the CGH. Known errors can be calculated out when measuring the shape of the test piece. The CGH thus forms the reference. While a calibration of all non-rotationally symmetric errors is possible with high accuracy for rotationally symmetric aspheres, in the case of free-form surfaces, that is to say non-spherical surfaces without rotational symmetry, all CGH errors affect the shape measurement. As a result, the requirements regarding the accuracy of the measurement of the CGH increase significantly. It is important to know with high precision the distortion of the diffractive structures of the CGH, that is to say the lateral positions of the diffractive structures in relation to their desired positions, and also the profile shape of the CGH. However, the measurement accuracy with which these parameters can be determined using measurement devices known from the prior art is not sufficient for the constantly increasing requirements.

DE 10 2012 217 800 A1 describes such a measurement arrangement having a complex coded CGH. A light wave is initially split into a reference wave and a test wave using a Fizeau element. The test wave is then converted by the complex coded CGH into a test wave having a wavefront that is adapted to the desired shape of the surface and calibration waves having a spherical or plane wavefront. To this end, the CGH contains suitably configured diffractive structures. The calibration waves are used to calibrate the CGH. A test object is subsequently arranged in the test position, and a measurement with the test wave is carried out. The test wave is reflected by the surface of the test object, transformed back by the CGH, and, following the passage through the Fizeau element, it is superimposed by the reference wave. It is possible to determine the shape of the surface from the interferogram captured in a plane. Although the calibration of the CGH improves the accuracy, this is not always sufficient for advanced applications.

SUMMARY

It is an object of the invention to provide a measurement apparatus and a measurement method of the type mentioned in the introductory part, with which the aforementioned problems are solved and, in particular, a determination of the shape of optical surfaces in the form of free-form surfaces with improved accuracy is made possible.

The aforementioned object can be achieved according to the invention, for example, with a measurement apparatus for interferometrically determining a shape of a surface of a test object, wherein the measurement apparatus comprises: a radiation source for providing an input wave, a multiply-encoded diffractive optical element, which is configured to produce by diffraction from the input wave a test wave, which is directed at the test object and has a wavefront in the form of a free-form surface, and at least one calibration wave, wherein the calibration wave has a wavefront with a non-rotationally symmetric shape. Cross sections through the wavefront of the calibration wave along cross-sectional surfaces aligned transversely to one another in each case have a curved shape. The curved shapes in the different cross-sectional surfaces differ here in terms of an opening parameter. Furthermore, the measurement apparatus comprises a capture device for capturing a calibration interferogram formed by the superimposition of a reference wave with the calibration wave after interaction with a calibration object.

A free-form surface is to be understood to mean a shape with a deviation from any rotationally symmetric asphere of more than 5 µm, in particular more than 10 µm. Furthermore, the free-form surface deviates from any sphere by at least 0.05 mm, in particular at least 0.1 mm, at least 1 mm or at least 5 mm. In particular, the measurement apparatus comprises an evaluation device for determining the shape of the surface of the test object by evaluating an interferogram captured by the superimposition of the reference wave with the test wave after interaction with the surface, taking into account the interferogram formed by the superimposition with the calibration wave.

The design according to the invention of the calibration wave with a non-rotationally symmetric wavefront allows the difference between the wavefront of the test wave and the wavefront of the calibration wave, hereinafter also referred to as the test wavefront difference, to be minimized.

The invention makes use of the finding that the quality of the calibration of the diffractive optical element with regard to the free-form test wave to be produced is all the better, the smaller the deviation of the shape of the calibration wave from the wavefront shape of the test wave is. The reason for this is that the partial structures of the multiply-encoded diffractive optical element responsible for producing the calibration wave and the test wave are all the more similar, the more similar the calibration wave and the test wave are to one another. During the manufacture of the diffractive optical element, similar partial structures are in turn subject to similar manufacturing errors and have comparatively small differences in their groove width profiles.

By configuring the diffractive optical element such that it produces the calibration wave with a non-rotationally symmetric wavefront, it becomes possible to keep the test wavefront difference as small as possible. This in turn allows effects of manufacturing errors in the diffractive optical element on the test wave to be predicted with a high level of accuracy using calibration data determined with the calibration wave.

As mentioned above, cross sections through the wavefront of the calibration wave along cross-sectional surfaces aligned transversely to one another in each case have a curved shape, wherein the curved shapes in the different cross-sectional surfaces differ in terms of an opening parameter. In particular, the cross-sectional surfaces are aligned perpendicular to one another.

According to an embodiment, the curved shapes in the two different cross-sectional surfaces differ in terms of their direction of curvature.

According to a further embodiment, the curved shape approximates in each case a segment of a circular shape and the opening parameter is the circle radius. This is to be understood to mean that the curved shape in the different cross sections in each case has a segment of a circular shape or has approximately the segment of the circular shape, in particular the curved shape corresponds in each case to a segment of a circular shape.

According to a further embodiment, the curved shape approximates in each case a segment of a parabolic shape and the opening parameter is the parabola opening. This means that the curved shape in the different cross sections in each case corresponds to a segment of a parabolic shape or approximately to the segment of the parabolic shape. The segment of the parabolic shape comprises in particular the vertex region of the parabola, in particular the segment has a symmetric vertex region of the parabola.

According to a further embodiment, the wavefront of the calibration wave has an astigmatic shape.

According to a further embodiment, the non-rotationally symmetric shape of the calibration wave corresponds to the shape of a surface of a solid of revolution, which is formed by rotation of a surface which is symmetrical to an axis of symmetry, hereinafter also referred to as a surface of revolution, about an axis of rotation. The section of the surface of this solid of revolution has a symmetry to a plane and can therefore also be described as mirror-symmetric. According to a first embodiment variant, the surface of revolution is circular and the axis of rotation is truly parallel to the axis of symmetry. In this case, the solid of revolution that results is a torus. According to a second embodiment variant, the surface of revolution is non-rotationally symmetric, for example elliptical.

According to a further embodiment, the wavefront of the calibration wave deviates from any rotationally symmetric shape by at least 50 μm, in particular by at least 100 μm.

According to a further embodiment, the diffractive optical element is configured to produce in addition to the test wave at least three calibration waves by diffraction from the input wave.

The aforementioned object can also be achieved, for example, by a method for calibrating a diffractive optical element, which is configured to produce a test wave with a wavefront in the form of a free-form surface for interferometrically determining a shape of a surface of a test object.

The method according to the invention comprises providing the diffractive optical element with multiple encoding and radiating in an input wave so that a calibration wave that is directed at a calibration object is produced in addition to the test wave by diffraction at the multiple encoding, wherein the calibration wave has a wavefront with a non-rotationally symmetric shape. Furthermore, the method according to the invention comprises arranging the calibration object at different calibration positions such that the calibration wave is in each case substantially perpendicularly incident on different regions of a surface of the calibration object. Furthermore, the method according to the invention comprises capturing and comparing calibration interferograms which are produced by the superposition of a reference wave with the calibration wave after interaction with the calibration object at the different calibration positions.

According to the method according to the invention, the calibration object is arranged at different calibration positions such that the calibration wave is substantially perpendicularly incident in each case on different regions of a surface of the calibration object. Furthermore, the calibration interferograms produced at the different calibration positions are compared with one another. In other words, different subapertures of the calibration object are irradiated with the calibration wave in the various calibration positions. By evaluating the totality of the various calibration interferograms using a suitable evaluation algorithm, wavefront errors of the calibration wave can be separated from shape errors of the calibration object.

According to an embodiment, the various calibration positions of the calibration object are set by a combination of shifting and tilting the calibration object. Furthermore, retrace errors occurring for the different calibration positions can be taken into account by calculation.

Furthermore, the invention provides a method for interferometrically determining a shape of a surface of a test object. This method comprises the steps of: providing a multiply-encoded diffractive optical element, which is configured to produce by diffraction from an input wave a test wave, which is directed at the test object and has a wavefront in the form of a free-form surface, and at least one calibration wave, calibrating the diffractive optical element according to one of the previously described embodiments or embodiment variants, capturing a measurement interferogram produced by the superimposition of the reference wave with the test wave after interaction with the surface of the test object, and ascertaining the shape of the surface of the test object by evaluating the measurement interferogram, taking into account the calibration interferogram.

According to an embodiment, for the purpose of testing a plurality of similar yet different free-form surfaces, the totality of all test wavefront differences, i.e. the differences between the wavefronts of the test wave and calibration wave, can be kept small, for example by choosing the realized test wavefront difference as the mean value of the test wavefront differences of all the tested free-form surfaces.

Furthermore, the invention provides a method for interferometrically determining a respective shape of a multiplicity of surfaces. The surfaces each have the form of a free-form surface, wherein an astigmatic component of a deviation of the respective free-form surface from a best-fit sphere lies between 70% and 90%, in particular between 75% and 85%. The method according to the invention comprises the step of: calibrating interferometrically determined shape measurement results of the surfaces with a uniform calibration surface, wherein a deviation of the uniform calibration surface from a best-fit sphere has an astigmatic component which corresponds to the mean value of the astigmatic components of the multiplicity of surfaces.

With regard to the definition of the astigmatic component, reference is made in particular to DE 10 2013 226 668 A1. The measured surfaces are similar to one another due to the mentioned astigmatic component, but differ from one another. In other words, to determine the respective shape of a multiplicity of surfaces by respectively using a calibration surface, only a single calibration surface is required. The determination of the shape measurement results of the surfaces can in each case be carried out analogously to the interferometric measurement method described above, wherein the calibration wave is adapted in each case to the uniform calibration surface mentioned.

As mentioned above, a deviation of the uniform calibration surface from a best-fit sphere has an astigmatic component that corresponds to the mean value of the astigmatic components of the multiplicity of surfaces. That means that the astigmatic component assigned to the uniform calibration surface deviates from the mean value mentioned by at most 10%, in particular at most 5%.

Furthermore provided, according to the invention, is an optical element for a projection lens of a microlithographic exposure apparatus with an optical surface having a desired shape in the form of a free-form surface and a deviation of the actual shape of the optical surface from the desired shape with a root mean square of at most 100 pm, wherein the desired shape has a maximum deviation from its best-fit sphere in the range of 0.1 mm and 20 mm. In particular, the root mean square of the deviation of the actual shape from the desired shape is at most 20 pm, in particular at most 10 μm. The root mean square is also known by the abbreviation RMS. A microlithographic exposure apparatus comprises a radiation source, an illumination system for irradiating a mask, and a projection lens for imaging mask structures onto a substrate. Furthermore, the desired shape deviates from any rotationally symmetric asphere by at least 5 in particular by at least 10 μm.

At the point of maximum deviation from the best-fit sphere, the desired shape has a deviation value which is at least 0.1 mm and at most 20 mm. In other words, the maximum deviation of the desired shape from any sphere is at least 0.1 mm, but the deviation from the best-fit sphere is at most 20 mm. According to an embodiment, the maximum deviation of the desired shape from its best-fit sphere is at least 1 mm, in particular at least 5 mm. According to a further embodiment, the maximum deviation is at most 8 mm.

According to an embodiment variant, the best-fit sphere can be understood to mean the sphere in which the maximum deviation from the desired shape is smallest. Alternatively, the best-fit rotationally symmetric reference surface can also be determined by minimizing the root mean square of the deviation or by minimizing the mean deviation. A free-form surface is understood to mean a non-spherical surface without rotational symmetry.

According to a further embodiment, the optical element is configured as a mirror element for a microlithographic exposure apparatus in the EUV wavelength range. The EUV wavelength range (extreme ultraviolet wavelength range) is understood to mean the wavelength range below 100 nm, in particular a wavelength of approximately 13.5 nm or approximately 6.8 nm.

The features specified with respect to the aforementioned embodiments, exemplary embodiments or embodiment variants, etc., of the measurement apparatus according to the invention can be correspondingly applied to the calibration method according to the invention or the method according to the invention for interferometrically determining shapes, and vice versa. These and other features of the embodiments according to the invention will be explained in the description of the figures and in the claims. The individual features can be implemented, either separately or in combination, as embodiments of the invention. Furthermore, they can describe advantageous embodiments which are independently protectable and protection for which is claimed if appropriate only during or after pendency of the application.

BRIEF DESCRIPTION OF THE DRAWINGS

The above and further advantageous features of the invention will be illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
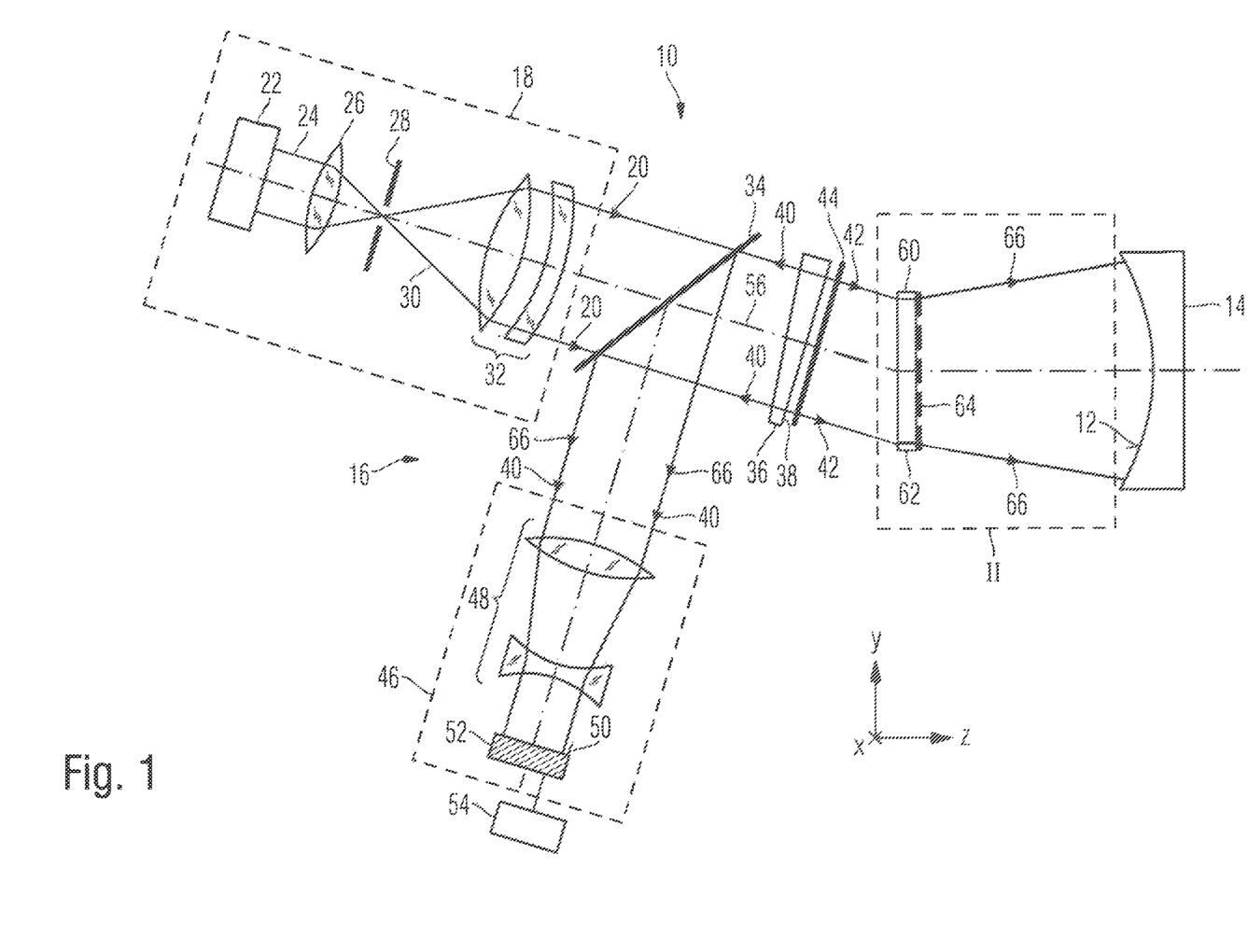
FIG. 1 shows an embodiment of a measurement apparatus for interferometrically determining a shape of an optical surface of a test object with a diffractive optical element for producing a test wave adapted to a desired shape of the surface.

In order to facilitate the description, a Cartesian xyz-coordinate system is indicated in the drawing, from which system the respective positional relationship of the components illustrated in the figures is evident. In FIG. 1, the x-direction extends perpendicular to the plane of the drawing into said plane, the y-direction extends upward, and the z-direction extends to the right.

FIG. 1 illustrates an interferometric measurement apparatus 10 in an exemplary embodiment according to the invention. The measurement apparatus 10 is suitable for interferometrically determining a shape of a surface 12 of a test object 14 in the form of an optical element. This is accomplished by ascertaining a deviation of the actual shape of the surface 12 from a predetermined, i.e., desired shape.

The test object 14 can be designed, for example, in the form of an optical lens element or a mirror. In the case shown, the test object 14 is a concave mirror for EUV lithography, i.e. a mirror that is designed for use in a microlithographic projection exposure apparatus with an exposure wavelength in the extreme ultraviolet (EUV) wavelength range, in particular for use in the projection lens of the projection exposure apparatus. The EUV wavelength range extends to wavelengths below 100 nm and relates in particular to wavelengths of approximately 13.5 nm and/or approximately 6.8 nm.

The optical test object 14 is mounted in the measurement apparatus 10 with a holder (not shown in the drawing). The measurement apparatus 10 is configured to measure optical surfaces 12 whose desired shape is a free-form surface. In this text, a free-form surface is to be understood to mean a shape with a deviation from any rotationally symmetric asphere of more than 5 μm, in particular more than 10 μm; furthermore, the free-form surface deviates from any sphere by at least 0.1 mm, in particular at least 1 mm or at least 5 mm.

The interferometric measurement apparatus 10 comprises an interferometer 16, which in turn comprises a light source 18, a beam splitter 34, and a capture device 46 in the form of an interferometer camera. The light source 18 produces illumination radiation 20 and for this purpose comprises, for example, a laser 22, such as a helium-neon laser for producing a laser beam 24. The illumination radiation 20 has sufficient coherent light to carry out an interferometric measurement. In the case of a helium-neon laser, the wavelength of the illumination radiation 20 is approximately 633 nm. However, the wavelength of the illumination radiation 20 may also have other wavelengths in the visible and non-visible wavelength ranges of electromagnetic radiation.

The laser beam 24 is focused by a focusing lens element 26 onto a stop 28 such that a divergent beam 30 of coherent light emanates from the aperture. The wavefront of the divergent beam 30 is substantially spherical. The divergent beam 30 is collimated by a lens group 32, as a result of which the illumination radiation 20 is produced with a wavefront that is substantially plane in the present case. The illumination radiation 20 propagates along an optical axis 56 of the interferometer 16 and passes through the beam splitter 34.

The illumination radiation 20 is then incident on a Fizeau element 36 with a Fizeau surface 38. A part of the light of the illumination radiation 20 is reflected as a reference wave 40 at the Fizeau surface 38. The light of the illumination radiation 20 passing through the Fizeau element 36 propagates further along the optical axis 56 with a plane wavefront 44 as an incoming measurement wave, referred to below as input wave 42, and is incident on a multiply-encoded diffractive optical element 60. In other embodiments of the measurement apparatus 10, the wavefront of the input wave 42 may also be spherical.

The diffractive optical element 60 comprises a substrate 62 which is transmissive to the wavelength of the illumination radiation 20 and a diffractive structure pattern 64, arranged on the substrate 52, in the form of a computer-generated hologram (CGH).

In a first embodiment, the structure pattern 64 is configured in such a way that the input wave 42 is split by diffraction at the structure pattern 64 into a test wave 66 in the form of a free-form surface and at least one calibration wave 68 (see FIG. 2) having a non-rotationally symmetric shape. In general, a non-rotationally symmetric shape is to be understood to mean a shape which deviates from any rotationally symmetric shape by at least 50 μm. According to an embodiment variant, the non-rotationally symmetric shape deviates from any rotationally symmetric asphere by more than 5 μm; furthermore, the non-rotationally symmetric shape can have the above-defined shape of a free-form surface. Various embodiments of the non-rotationally symmetric shape will be described below, which is characterized by further parameters in addition to the general feature of the deviation of at least 50 μm from any rotationally symmetric shape.

As an alternative to the interferometric measurement apparatus 10 illustrated in FIG. 1 with a Fizeau element 36 for producing the reference wave 40, the reference wave can also be produced at the diffractive optical element 60, as shown for example in FIG. 1 of DE 10 2015 209 490 A1, and be reflected by a reference mirror.

Figure 2:
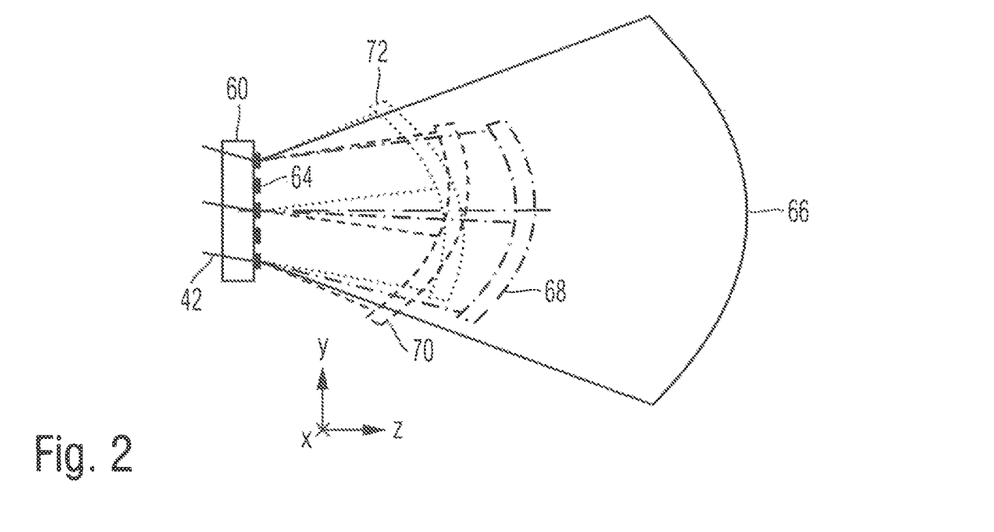
FIG. 2 shows the diffractive optical element according to FIG. 1 with a multiply-encoded diffractive structure pattern for producing calibration waves in addition to the test wave.

In the embodiment illustrated in FIG. 2, two further calibration waves 70 and 72 are produced at the structural pattern 64 in addition to the calibration wave 68. The calibration waves 70 and 72 may each have a plane or a spherical wavefront. According to an embodiment, one or both of the further calibration waves 70 and 72 each has, like the calibration wave 68, a non-rotationally symmetric shape, but one that is of a different type than the calibration wave 68.

The test wave 66 is also shown in FIG. 1 and is used to measure the actual shape of the optical surface 12 of the test object 14. For this purpose, the test wave 66 has a wavefront that is adapted to the desired shape of the optical surface 12. As mentioned above, the test wave 66 has the shape of a free-form surface.

Figure 3A:
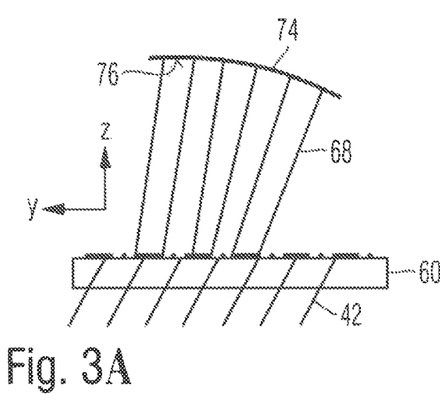
FIG. 3A shows the diffractive optical element according to FIG. 2 during the measurement of a first calibration object with a first calibration wave.

Before the measurement of the test object 14, for which the latter is arranged, as illustrated in FIG. 1, in the beam path of the test wave 66, the measurement apparatus 10 is first operated in a calibration mode. In this mode, rather than the test object 14, a first calibration object 74 is initially arranged on the output wave side with respect to the diffractive optical element 60, to be precise in the beam path of the first calibration wave 68, as is illustrated schematically in FIG. 3A. With the exception of error deviations, the shape of the calibration wave 68 corresponds to the shape of a calibration surface 76 of the calibration object 74, in other words the shape of the calibration surface 76 of the calibration object 74 is adapted to the abovementioned non-rotationally symmetric desired shape of the calibration wave 68. This non-rotationally symmetric desired shape thus serves as a desired shape both for the calibration wave 68 and for the calibration object 74.

The calibration wave 68 is incident on the calibration surface 76 of the calibration object 74 and is thereby reflected back on itself. The reflected calibration wave 68 again passes through the diffractive optical element 60 and, after being reflected at the beam splitter 34, is directed by a lens system 48 of the capture device 46 onto a capture surface 50 of a camera chip 52 of the capture device 46 (cf. FIG. 1 with the test wave 66 replaced by the calibration wave 68).

A calibration interference pattern is produced on the capture surface 50 owing to the superposition with the reference wave 40, from which pattern the deviation of the calibration wave 68 from its desired wavefront is determined by with an evaluation device 54. However, this takes place on the assumption that any deviations of the calibration object 74 from the desired shape are negligible. The actual wavefront of the calibration wave 68 is thus determined with a high level of accuracy using the calibration object. The deviations of the calibration wave 68 from its desired wavefront are stored as calibration deviations K1 in the evaluation device 54.

Figure 14A:
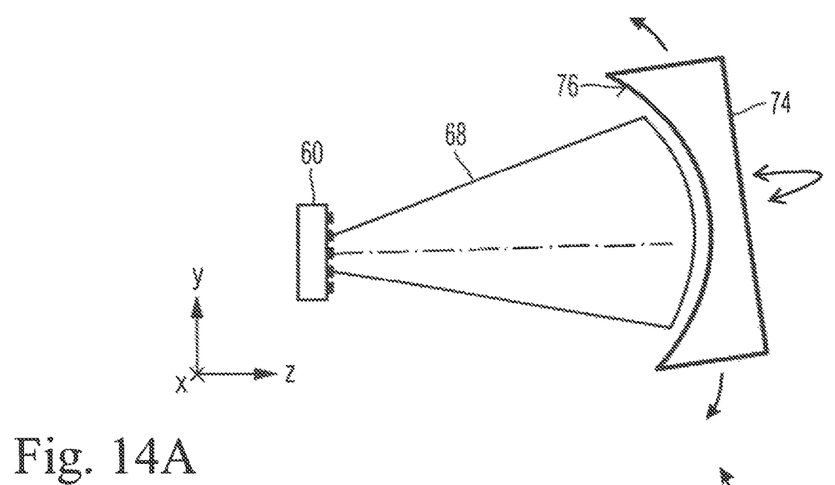
FIG. 14A shows the diffractive optical element according to FIG. 1 and a calibration object which is arranged in a first calibration position.
Figure 14B:
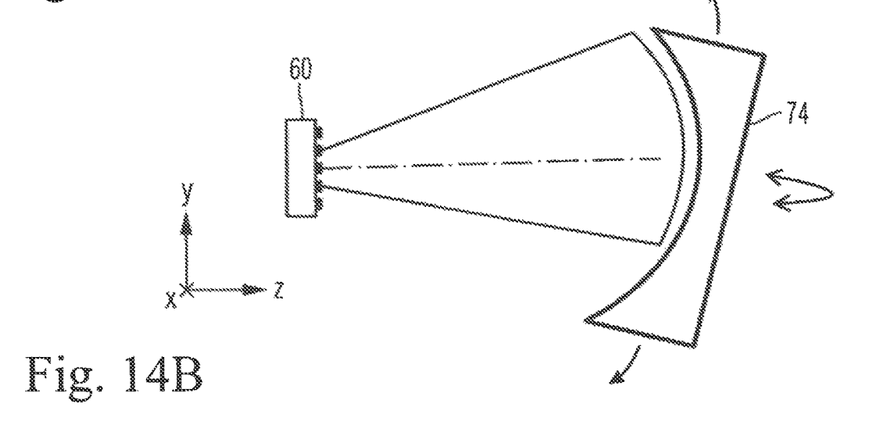
FIG. 14B shows the diffractive optical element according to FIG. 1 and a calibration object which is arranged in a second calibration position.
Figure 15:
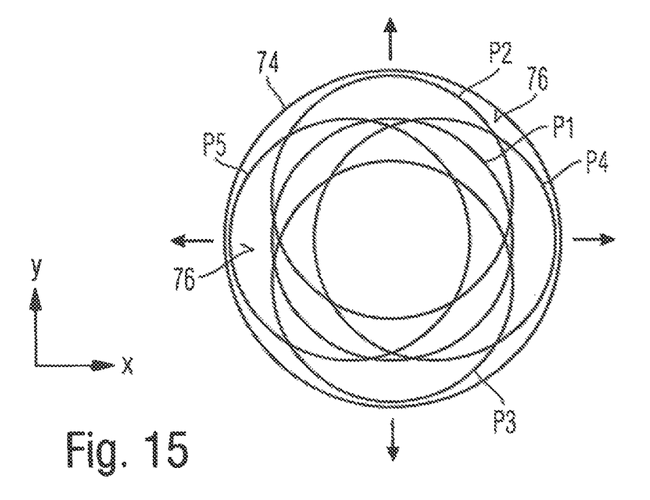
FIG. 15 shows a top view of the calibration object with an illustration of surfaces irradiated in different calibration positions.

According to an embodiment variant of the determination of the calibration deviations K1 illustrated in FIGS. 14A, 14B and 15, the calibration object 74 is measured at a plurality of different calibration positions. For this purpose, the calibration object 74 is preferably configured in such a way that the diameter of the calibration surface 76 is larger than the diameter of the calibration wave 68 by at least 5%, in particular at least 10%, i.e. when the calibration wave 68 is irradiated centrally, a corresponding non-irradiated peripheral region remains on the calibration surface 76.

To set the different calibration positions, the calibration object 74 is displaced with a combination of tilting and, in particular, shifting, with a positioning device (not shown in the drawing). FIG. 14A shows a first calibration position of the calibration object 74, in which the calibration wave 68 is incident on the calibration surface 76 substantially centrally. The individual rays of the calibration wave 68 are incident on the calibration surface 76 substantially perpendicularly in this case.

FIG. 14B shows a second calibration position which, starting from the first calibration position, is set by tilting the calibration object 74 downward (i.e. tilting with respect to the x-axis), with the result that the region of the calibration surface irradiated by the calibration wave 68 is, for example, shifted upward by at least 5% or at least 10% of the diameter of the calibration wave 68. Here, the individual rays of the calibration wave 68 are also incident on the calibration surface substantially perpendicularly. In order to ensure this, a suitable shift of the calibration object 74 in the yz-plane takes place in addition to the abovementioned tilting.

As explained in more detail below, the cross-sectional shape of the calibration surface 76 and thus also of the wavefront of the calibration wave 70 can be circular or parabolic, for example. With a suitable combination of tilting and shifting, a substantially perpendicular irradiation by the individual rays of the calibration wave 68 can be brought about, both in the case of a circular and a parabolic cross-sectional shape, even in the second calibration position illustrated in FIG. 14B. In the case of a circular cross-sectional shape, the combination of tilting and shifting is also referred to as "spherization."

FIG. 15 illustrates the respective surface irradiated by the calibration wave 68 in different calibration positions in a plan view of the calibration surface 76. The central calibration position described with reference to FIG. 14A is denoted by P1, and the downwardly tilted calibration position described with reference to FIG. 14B is denoted by P2. By appropriately tilting the calibration object 74 upward, the calibration position denoted by P3 can be set with a simultaneous shift in the yz-plane. Furthermore, the calibration positions denoted by P4 and P5 can be set by tilting the calibration object to the left or to the right (i.e. tilting with respect to the y-axis) while simultaneously shifting the calibration object 74 in the xy-plane.

According to an embodiment, corresponding calibration interferograms are recorded for some or all of these further calibration positions P2 to P5, and possibly for further calibration positions, analogously to the calibration position P1. Owing to an evaluation of all the recorded calibration interferograms by the evaluation device 54 using a suitable evaluation algorithm, wavefront errors of the calibration wave 68 can now be separated from shape errors of the calibration object 74. In other words, according to this embodiment, the actual deviations of the calibration object 74 from the desired shape can be taken into account and the actual wavefront of the calibration wave 68 and the calibration deviations K1 can thus be determined with a further improved accuracy. To further improve the accuracy of the calibration deviations K1, the retrace errors occurring for the various calibration positions P1 to P5, i.e. the errors accumulated due to the lens errors in the optical unit of the interferometric measurement apparatus 10 in dependence on the beam path of the test wave 66 through the optical unit, can be taken into account by calculation.

According to an embodiment, during the evaluation of the different calibration interferograms, the wavefront sections of the calibration wave 68 that are present in the different calibration positions P1 to P5 and illuminate respective subapertures of the calibration surface 76 are combined by stitching methods, as they are known.

Figure 3B:
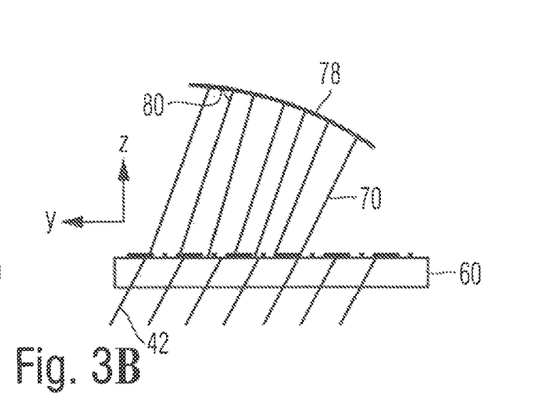
FIG. 3B shows the diffractive optical element according to FIG. 2 during the measurement of a second calibration object with a second calibration wave.
Figure 3C:
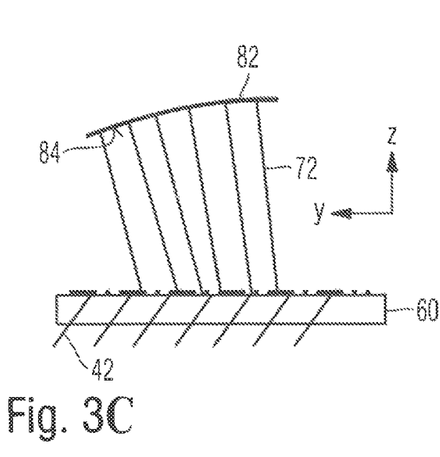
FIG. 3C shows the diffractive optical element according to FIG. 2 during the measurement of a third calibration object with a third calibration wave.

In addition to the calibration deviations K1 determined with the calibration wave 68, further calibration deviations K2 and K3 can be determined using the further calibration waves 70 and 72 according to the embodiment illustrated in FIG. 2. The directions of propagation of the calibration waves 70 and 72 differ from one another and from the direction of propagation of the calibration wave 68. The calibration deviations K2 and K3 are determined analogously to the determination of the calibration deviations K1 by arranging the calibration object 78 illustrated in FIG. 3B with the calibration surface 80 in the beam path of the calibration wave 70 and the calibration object 82 illustrated in FIG. 3C with the calibration surface 84 in the beam path of the calibration wave 72.

By evaluating the ascertained calibration deviations K1 to K3, x- and y-coordinates of distortions of the phase functions of the diffractive structure pattern 64 on the diffractive optical element 60 that produce the calibration waves 68, 70 and 72 can now be ascertained. Furthermore, shape and/or profile deviations of the substrate surface of the diffractive optical element 60 having the diffractive structure pattern 64 can be determined from the calibration deviations K1 to K3. From the distortion coordinates thus obtained and shape and/or profile deviations, the distortion in x- and y-coordinates and the shape and/or profile deviations of the entire diffractive structure pattern 64 are then inferred. These deviation data are stored in the evaluation device 54 and are used to correct the test wave 66 during the measurement of the surface shape of the test object 14 that now follows.

Figure 3D:
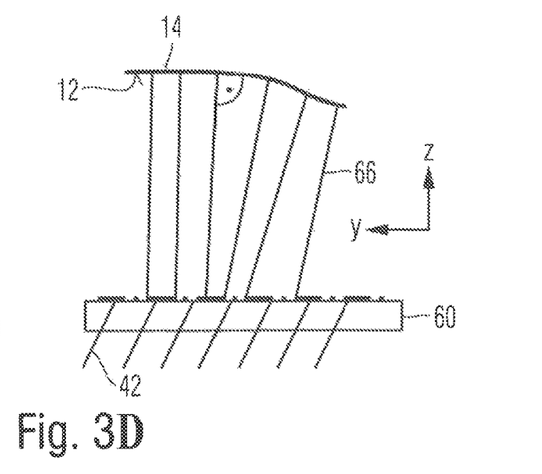
FIG. 3D shows the diffractive optical element according to FIG. 2 during the measurement of the optical surface of the test object.

For this purpose, the test object 14, as shown in FIG. 1 and FIG. 3D, is arranged in the beam path of the test wave 66 in such a way that it is incident on the optical surface 12 in autocollimation and is reflected at it. The reflected wave then runs back through the diffractive optical element 60 into the interferometer 16 as a returning test wave 66. The returning test wave 66 interferes with the reference wave 40 on the capture surface 50, thereby producing a test interferogram. The test interferogram is evaluated by with the evaluation device 54 and the deviation of the actual shape of the optical surface 12 from its desired shape is ascertained therefrom. All deviation data previously ascertained during the measurement of the calibration surfaces are taken into account in the evaluation.

Figure 3E:
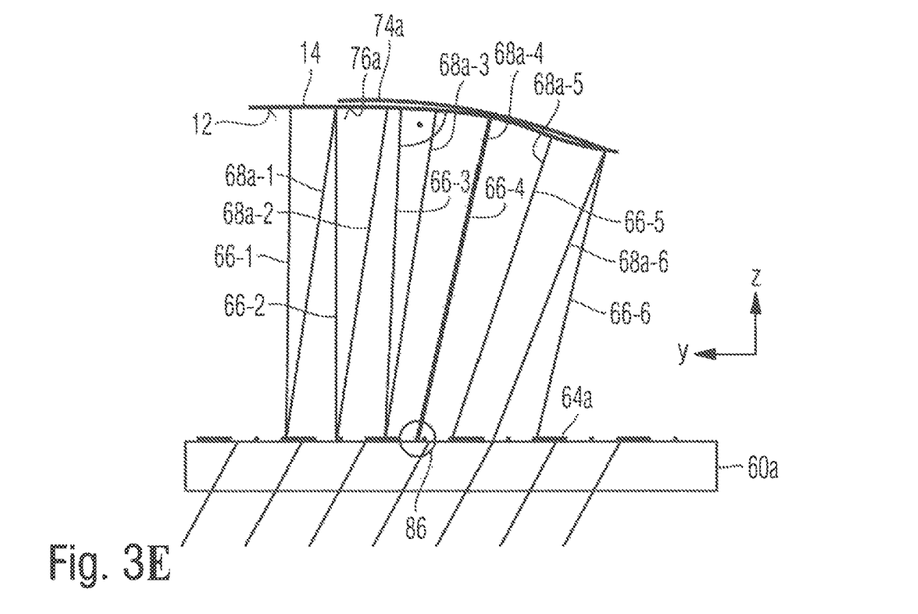
FIG. 3E shows an illustration of the first calibration wave according to FIG. 3A and of the test wave according to FIG. 3C when a disadvantageous special case arises.

FIG. 3E illustrates a disadvantageous special case of matching directions of diffraction between the calibration wave and the test wave at what is referred to as a pole 86, but which can be avoided due to the degrees of freedom made possible by the configuration according to the invention of the calibration wave with a non-rotationally symmetric shape. This disadvantageous special case is shown in FIG. 3E by the simultaneous illustration of the individual rays 66-1 to 66-6 of the test wave 66 adapted to the shape of the surface 12 of the test object 14 and of the individual rays 68a-1 to 68a-6 of the calibration wave 68a, which is adapted to the calibration surface 76a of a disadvantageous embodiment of the first calibration object 74a.

As can be seen in FIG. 3E, the individual rays 66-4 (of the test wave 66) and 68a-4 (of the calibration wave 68), in the disadvantageous embodiment shown, which emanate from the point of the diffractive structure pattern 64a of the associated diffractive optical element 60a that is referred to as pole 86, travel along the same path. At the pole 86, the difference between the two associated phase functions of the associated diffractive structure pattern 64a has a zero, which results in relatively large groove spacings in the diffractive structure pattern 64a. These in turn can adversely affect the diffraction intensity. Put simply, this case leads to a gap in the diffractive structure pattern 64a. As already mentioned above, such a pole can be avoided due to the degrees of freedom in the configuration of the calibration wave 68 that are available for the calibration wave 68 through the use of a non-rotationally symmetric shape, in particular an astigmatic shape.

According to an embodiment, for the interferometric measurement of a respective shape of a multiplicity of optical surfaces 12, which are similar in that their desired shapes, each of which has the form of a free-form surface, have a respective astigmatic component of a deviation of the respective free-form surface from a best-fit sphere with a value of between 70% and 90%, a uniform calibration surface can be used to calibrate the shape measurement results. In this case, the uniform calibration surface can be configured in such a way that a deviation of the calibration surface from a best-fit sphere has an astigmatic component which corresponds to the mean value of the astigmatic components of the multiplicity of optical surfaces.

Various embodiments of the abovementioned, non-rotationally symmetric shape of the calibration wave 68 and of the associated calibration object 74 will be illustrated below with reference to FIGS. 4 to 13. As mentioned above, the non-rotationally symmetric shape is characterized in that it deviates from any rotationally symmetric shape by at least 50 μm. The embodiments of the non-rotationally symmetric shape illustrated below can be used in further calibration waves produced at the diffractive structure pattern 64 of the diffractive optical element 60, such as the calibration waves 70 and 72.

In all of the embodiments shown in FIGS. 4 to 13, the non-rotationally symmetric shape of the calibration wave 68, hereinafter referred to as 68f, corresponds to the shape of a section of a surface 89 of a solid of revolution 88 illustrated in FIG. 10. This solid of revolution 88 is formed by rotating a surface of revolution 90, which is symmetrical to an axis of symmetry 92, about an axis of rotation 94. In the embodiments shown, the axis of symmetry 92 is arranged parallel to the axis of rotation 94. In alternative embodiments, the axis of symmetry 92 can also be aligned non-parallel with respect to the axis of rotation 94. The surface of revolution 90, which can also be described as "mirror-symmetric" because of its axial symmetry, can, for example, be configured to be rotationally symmetric and thus circular (cf. surface of revolution 90a) or non-rotationally symmetric, such as elliptical (cf. surface of revolution 90b with the semi-major axis a perpendicular to the axis of rotation 94 and surface of revolution 90c with the semi-minor axis a perpendicular to the axis of rotation 94).

The distance between the axis of rotation 94 and the axis of symmetry 92 is the radius R of the solid of revolution 88. The radius R can be greater than, equal to or smaller than the radius r of the surface of revolution 90a or than the semi-axis of the surface of revolution 90b or 90c perpendicular to the axis of symmetry 92. In the case of the circular surface of revolution 90a, the ring torus shown in FIG. 10 results for R>r for the solid of revolution 88, what is known as a horn torus results for R=r, and what is known as a spindle torus results for R<r. In the case of the circular surface of revolution 90a, R≠0 applies according to the invention.

Figure 11:
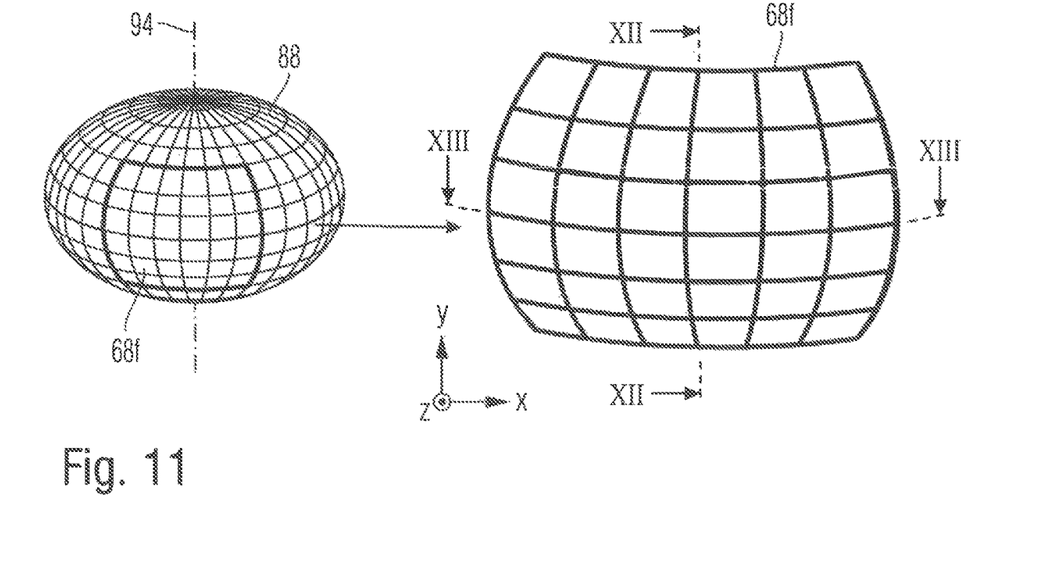
FIG. 11 shows an embodiment of an elliptical spindle torus, on which a surface section is marked.

In the case of the elliptical surfaces of revolution 90b and 90c, analogous solids result, which are referred to here as "elliptical ring torus" for R>a, "elliptical horn torus" for R=a, and "elliptical spindle torus" for R<a. In the case of the elliptical surfaces of revolution 90b or 90c, the case R=0 is also permitted. An example of an "elliptical spindle torus" with R=0 is shown in FIG. 11.

Figure 4:
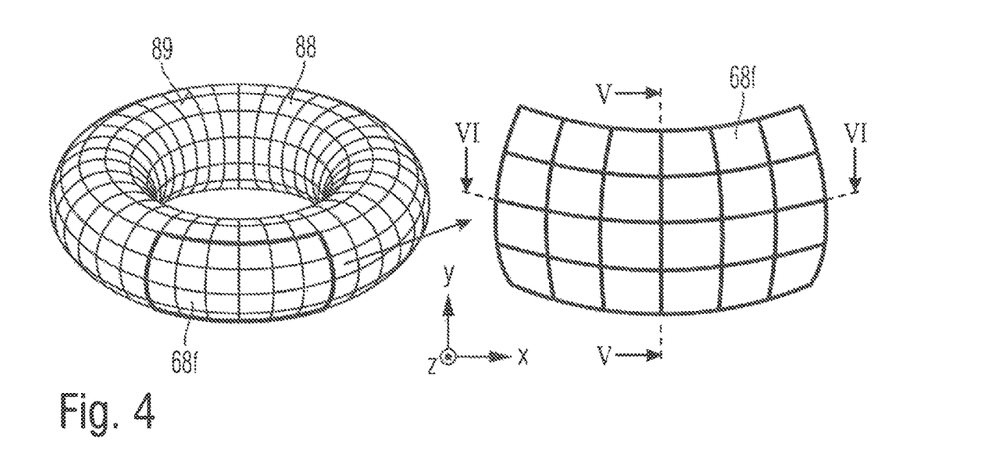
FIG. 4 shows an embodiment of a ring torus, on which a first surface section is marked.
Figure 7:
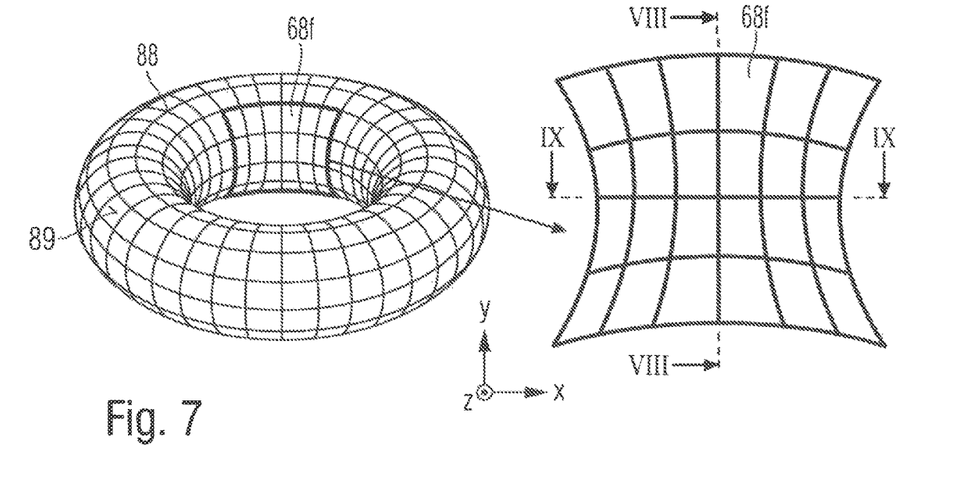
FIG. 7 shows the ring torus according to FIG. 4, on which a further surface section is marked.
Figure 10:
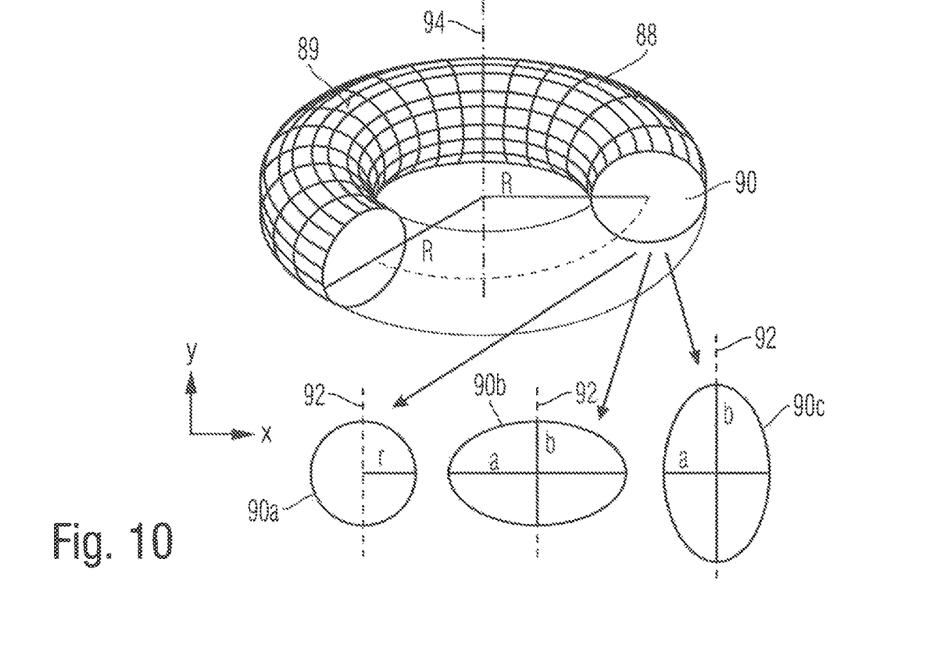
FIG. 10 shows the ring torus according to FIG. 4 in a cutaway view.

In FIGS. 4 and 7, two different sections from the surface 89 of the solid of rotation 88 shown in FIG. 10 in the form of a ring torus are selected by way of example in each case as the non-rotationally symmetric shape 68f of the calibration wave 68. This shape 68f is in each case mirror-symmetrical with respect to a mirror plane extending through the line designated V-V in FIG. 4 or the line designated VIII-VIII in FIG. 7. In the embodiment according to FIG. 4, the selected section lies on the outside of the ring torus and thus has a convex shape.

Figure 5:
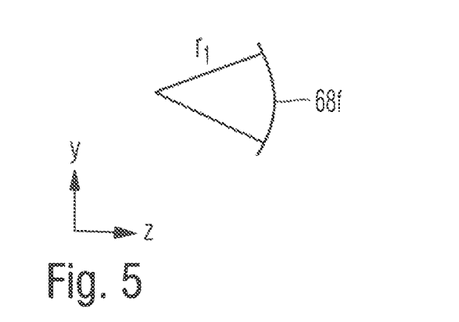
FIG. 5 is a sectional view along the line V-V in FIG. 4.
Figure 6:
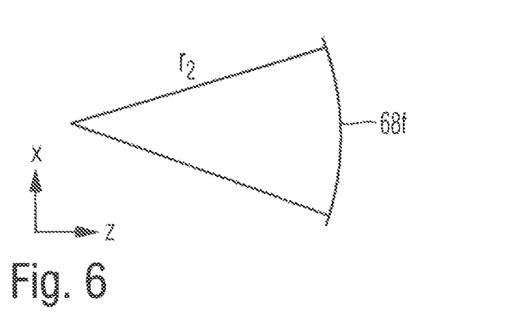
FIG. 6 is a sectional view along the line VI-VI in FIG. 4.

FIG. 5 shows a sectional view along the line V-V and FIG. 6 shows a sectional view along the line VI-VI each in the image of the non-rotationally symmetric shape 68f shown in the right-hand portion of FIG. 4. In other words, FIGS. 5 and 6 show cross sections through an embodiment of the wavefront of the calibration wave 68 along cross-sectional surfaces arranged perpendicularly to one another, to be precise once along the yz-plane and once along the xz-plane. In each of these two cross-sectional surfaces, the shape 68f of the wavefront has a circular shape and hence a curved shape. The circular shapes have the same direction of curvature and differ in terms of their opening parameters in the form of their respective radius $r_1$ or $r_2$.

Figure 8:
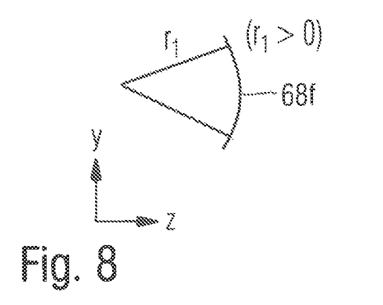
FIG. 8 is a sectional view along the line VIII-VIII in FIG. 7.
Figure 9:
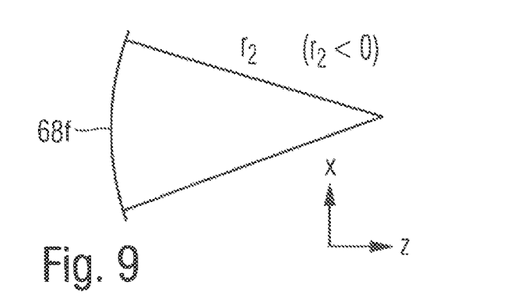
FIG. 9 is a sectional view along the line IX-IX in FIG. 7.

In the embodiment according to FIG. 7, the selected section lies on the inside of the ring torus and thus has a saddle shape. FIG. 8 illustrates a sectional view along the line VIII-VIII and FIG. 9 illustrates a sectional view along the line IX-IX in the image of the non-rotationally symmetric shape 68f shown in the right-hand portion of FIG. 7.

Analogously to FIGS. 5 and 6, FIGS. 8 and 9 show cross sections through an embodiment of the wavefront of the calibration wave 68 according to FIG. 7 along cross-sectional surfaces arranged perpendicularly to one another, to be precise once along the yz-plane and once along the xz-plane. Here, too, the wavefront has a circular shape and thus a curved shape in each of these two cross-sectional surfaces. The circular shapes have different directions of curvature and thus already different opening parameters, specifically radii with different signs ($r_1 > 0$ or $r_2 < 0$), and furthermore, the absolute values of the two radii also differ ($|r_1| < |r_2|$).

In the embodiment of the solid of revolution 88 shown in FIG. 11 in the form of an "elliptical spindle torus" with R=0, the section 68f selected on the front side of the solid of revolution 88 has, analogous to the section according to FIG. 5, a convex shape, but with parabolic cross-sectional profiles. The shape of the section 68f is mirror-symmetrical with respect to a mirror plane extending through the line designated XII-XII.

Figures 12, 13:
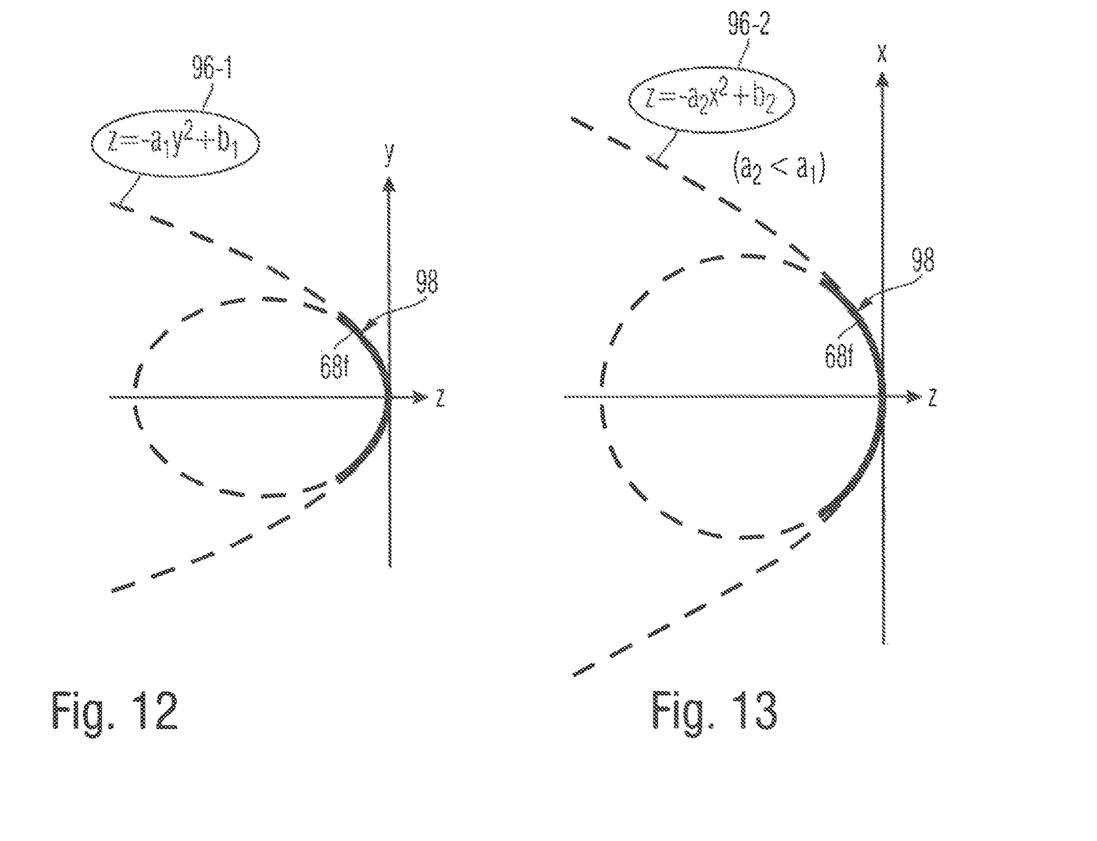
FIG. 12 is a sectional view along the line XII-XII in FIG. 11.
FIG. 13 is a sectional view along the line XIII-XIII in FIG. 11.

FIG. 12 shows a sectional view along the line XII-XII and FIG. 13 shows a sectional view along the line XIII-XIII each in the image of the non-rotationally symmetric shape 68f shown in the right-hand portion of FIG. 11. In other words, FIGS. 12 and 13 show cross sections through an embodiment of the wavefront of the calibration wave 68 along cross-sectional surfaces arranged perpendicularly to one another, to be precise once along the yz-plane and once along the xz-plane. In each of these two cross-sectional surfaces, the shape 68f of the wavefront is approximated in each case to the vertex region 98 of a parabolic shape 96-1 or 96-2 and thus has a curved shape.

The parabolic shape 96-1 shown in FIG. 12 can be described as follows: $z = -a_1 y^2 + b_1$, and the parabolic shape 96-2 shown in FIG. 13 can be described as follows: $z = -a_2 x^2 + b_2$, wherein in the present case: $b_1 = 0$ and $b_2 = 0$. The opening parameters of the parabolic shapes in the shape of the parabolic openings $a_1$ and $a_2$ differ from each other ($a_2 < a_1$). The wavefront of the calibration wave 68 for the embodiment according to FIG. 11 thus has an astigmatic shape.

Figure 16A:
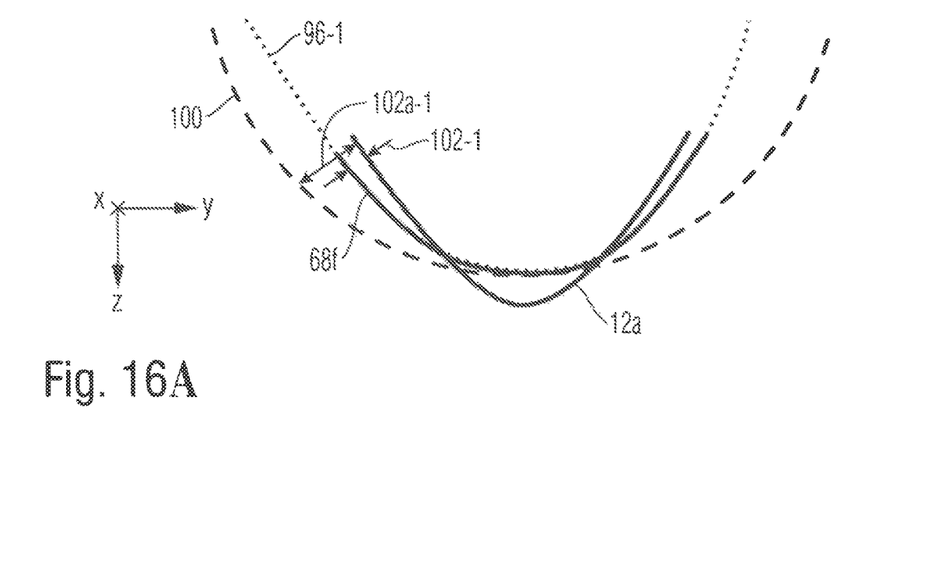
FIG. 16A shows an exemplary desired shape of the optical surface of the test object according to FIG. 1 in a first sectional plane, an exemplary non-rotationally symmetric shape of a calibration wave, and a circular shape best fitted with respect to the desired shape.
Figure 16B:
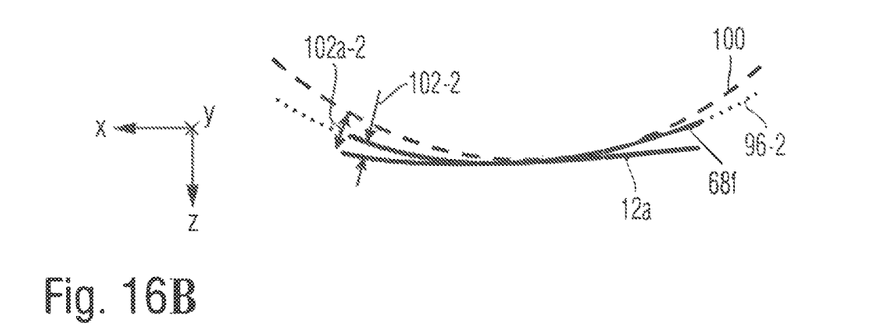
FIG. 16B shows an exemplary desired shape of the optical surface of the test object according to FIG. 1 in a second sectional plane, an exemplary non-rotationally symmetric shape of a calibration wave, and a circular shape best fitted with respect to the desired shape.

In FIGS. 16A and 16B, an exemplary desired shape 12a of the optical surface 12 is shown together with the non-rotationally symmetric shape 68f of the calibration wave 68 and a best-fit circular shape 100 in the respective sectional view of FIG. 12 or FIG. 13, i.e. in two mutually orthogonal sectional planes. For illustration purposes, as in FIGS. 12 and 13, a shape approximated to the respective vertex region 98 of the parabolic shapes 96-1 and 96-2 is selected as the non-rotationally symmetric shape 68f of the calibration wave 68. The best-fit circular shapes 100 drawn in FIGS. 16A and 16B each represent the sectional view through a sphere that is best fitted to the desired shape 12a and thus have the same radius.

If one now considers the swing 102-1 or 102-2, i.e. the maximum deviation, between the desired shape 12a of the optical surface 12 and the shape 68f of the calibration wave 68 in the two sectional views of FIGS. 16A and 16B, it becomes clear that said swing is significantly reduced compared with the corresponding swing 102a-1 or 102a-2 between the desired shape 12a and the best-fit circular shape 100. Due to this reduced swing, the use of the calibration wave 68 according to the invention with the non-rotationally symmetric shape 68f enables a significant improvement in the achievable calibration accuracy of the diffractive optical element 60 compared with the use of a spherical calibration wave as is customary in the prior art.

Figure 17:
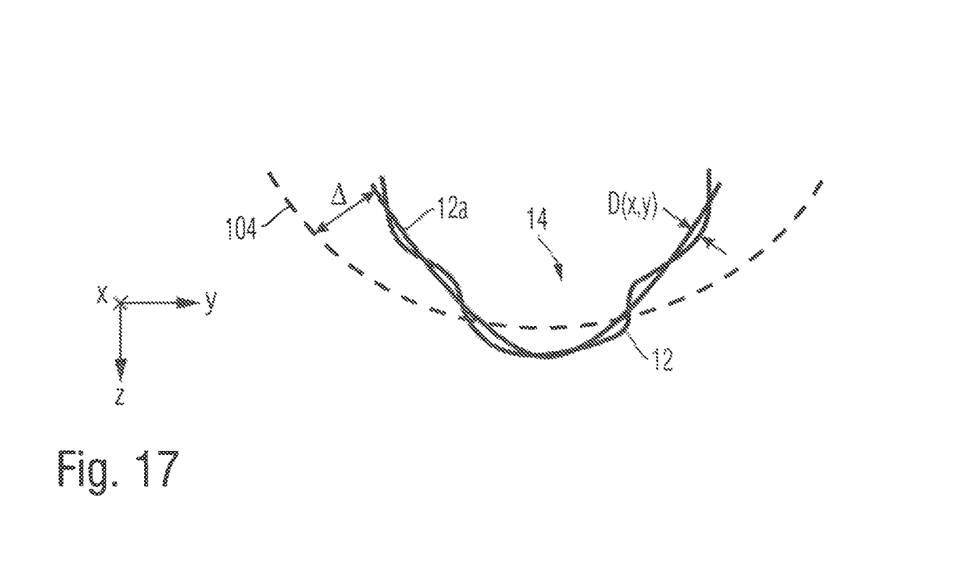
FIG. 17 shows an exemplary embodiment of the optical surface of an optical element of a projection lens of a microlithographic exposure apparatus.

In FIG. 17, the optical surface 12 of an optical element of the type designated as test object 14 in FIG. 1 is illustrated schematically in the yz-plane. In particular, the optical element 14 is an element of a projection lens of a microlithographic exposure apparatus, in particular a mirror element for the EUV wavelength range.

In addition to the optical surface 12 in its actual shape, the desired shape 12a of the optical surface and the sectional view of the sphere 104 that is best fitted to the desired shape 12a are shown in FIG. 17 analogously to FIG. 16A. The deviation of the actual shape of the optical surface 12 from the desired shape 12a, described by a two-dimensional deviation D(x,y), is schematically illustrated in a greatly enlarged fashion, wherein x and y denote the coordinates on the surface 12.

The root mean square of the deviation D(x,y) ascertained over the entire optical surface 12 is at most 100 μm, in particular at most 20 pm. The desired shape 12a, by contrast, has a maximum deviation Δ compared with the best-fit sphere 104, which is in the range from 0.1 mm and 20 mm, i.e. the maximum deviation Δ is at least 0.1 mm and at most 20 mm. In particular, the lower value of the range is 1 mm or 5 mm, and the upper value can be in particular 8 mm.

In a cross section of the optical surface 12 of the optical element 14 in the xz-plane, the optical surface 12 extends, aside from the deviation described by D(x, y), along the desired shape 12a shown in FIG. 16B. The maximum deviation of the desired shape 12a from the best-fit sphere 104 is smaller in this sectional plane than the deviation Δ in the sectional plane shown in FIG. 17. In this embodiment, the maximum deviation in the sectional plane according to FIG. 17 is greater than in all other possible sectional planes. The maximum deviation Δ according to FIG. 17 is therefore regarded as the maximum deviation Δ with respect to the best-fit sphere, as already mentioned above.

Since the desired shape 12a in the xz-plane (FIG. 16A) differs significantly from the desired shape 12a in the yz-plane (FIG. 16B), the desired shape 12a deviates significantly in the three-dimensional form from any rotationally symmetric asphere. According to the present embodiment, the maximum deviation of the desired shape 12a from any rotationally symmetric asphere is at least 5 in particular at least 10 μm.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that are also obvious in the understanding of the person skilled in the art. Therefore, all such alterations and modifications, insofar as they fall within the scope of the invention in accordance with the definition in the accompanying claims, and equivalents are intended to be covered by the protection of the claims.

LIST OF REFERENCE SIGNS

10 Interferometric measurement apparatus
12 Optical surface
12a Desired shape
14 Test object
16 Interferometer
18 Light source
20 Illumination radiation
22 Laser
24 Laser beam
26 Focusing lens element
28 Stop
30 Divergent beam
32 Lens group
34 Beam splitter
36 Fizeau element
38 Fizeau surface
40 Reference wave
42 Input wave
44 Plane wavefront
46 Capture device
48 Lens system
50 Capture surface
52 Camera chip
54 Evaluation device
56 Optical axis
60 Diffractive optical element
60a Diffractive optical element in a disadvantageous embodiment
62 Substrate
64 Diffractive structure pattern
64a Diffractive structure pattern in a disadvantageous embodiment
66 Test wave
66-1 to 66-6 Individual rays of the test wave 66
68 Calibration wave
68a-1 to 68a-6 Individual rays of the calibration wave 68a
68f Non-rotationally symmetric shape
70 Calibration wave
72 Calibration wave
74 First calibration object
74a First calibration object in a disadvantageous embodiment
76 Calibration surface
76a Calibration surface of the calibration object 76
78 Second calibration object
80 Calibration surface
82 Third calibration object
84 Calibration surface
86 Pole
88 Solid of revolution
89 Surface
90, 90a, 90b, 90c Surface of revolution
92 Axis of symmetry
94 Axis of rotation
96-1, 96-2 Parabolic shape
98 Vertex region
100 Best-fit circular shape
102-1, 102-2 Swing when using a non-rotationally symmetric calibration wave
102a-1, 102a-2 Swing when using a spherical calibration wave
104 Best-fit sphere

What is claimed is:

1. A measurement apparatus for interferometrically determining a shape of a surface of a test object, comprising:
a radiation source providing an input wave,
a multiply-encoded diffractive optical element, which is configured to produce by diffraction from the input wave a test wave, which is directed at the test object and has a wavefront formed as a free-form surface, as well as at least one calibration wave,
wherein the calibration wave has a wavefront with a non-rotationally symmetric shape, wherein cross sections through the wavefront of the calibration wave along cross-sectional surfaces aligned transversely to one another each have a respective curved shape and wherein the respective curved shapes in the cross-sectional surfaces differ in terms of an opening parameter, and
a capture device for capturing a calibration interferogram formed by superimposing a reference wave with the calibration wave after interaction with a calibration object.

2. The measurement apparatus as claimed in claim 1, wherein the curved shapes in two of the cross-sectional surfaces differ in terms of respective directions of curvature.

3. The measurement apparatus as claimed in claim 2, wherein the curved shapes approximate respective segments of a circular shape and wherein the opening parameter is a circle radius.

4. The measurement apparatus as claimed in claim 3, wherein the curved shapes approximate respective segments of a parabolic shape and wherein the opening parameter is a parabola opening.

5. The measurement apparatus as claimed in claim 2, wherein the wavefront of the calibration wave has an astigmatic shape.

6. The measurement apparatus as claimed in claim 1, wherein the non-rotationally symmetric shape of the calibration wave corresponds in shape to a section of a surface of a solid of revolution which is formed by rotating a surface that is symmetrical to an axis of symmetry about an axis of rotation.

7. The measurement apparatus as claimed in claim 1, wherein the wavefront of the calibration wave deviates from any rotationally symmetric shape by at least 50 μm.

8. The measurement apparatus as claimed in claim 1, wherein the diffractive optical element is configured to produce by diffraction from the input wave at least three calibration waves in addition to the test wave.

9. A method for calibrating a diffractive optical element, which is configured to produce a test wave with a wavefront formed as a free-form surface for interferometrically determining a shape of a surface of a test object, comprising:
providing the diffractive optical element with multiple encoding and radiating in an input wave, to produce a calibration wave directed at a calibration object in addition to the test wave, by diffraction at the multiple encoding,
wherein the calibration wave has a wavefront with a non-rotationally symmetric shape, arranging the calibration object at different calibration positions such that the calibration wave is respectively substantially perpendicularly incident on different regions of a surface of the calibration object, and capturing and comparing calibration interferograms which are produced by superimposing a reference wave with the calibration wave after interacting with the calibration object at the different calibration positions.

10. The method as claimed in claim 9, wherein the different calibration positions of the calibration object are set by a combination of shifting and tilting the calibration object.

11. A method for interferometrically determining a shape of a surface of a test object, comprising:

providing a multiply-encoded diffractive optical element, which is configured to produce by diffraction from an input wave a test wave, which is directed at the test object and has a wavefront formed as a free-form surface, as well as at least one calibration wave, calibrating the diffractive optical element as claimed in claim 9, capturing a measurement interferogram produced by the reference wave with the test wave after interacting with the surface of the test object, and ascertaining the shape of the surface of the test object by evaluating the measurement interferogram, in accordance with the calibration interferogram.

\* \* \* \* \*

UNITED STATES PATENT AND TRADEMARK OFFICE
CERTIFICATE OF CORRECTION

PATENT NO. : 11,892,283 B2
APPLICATION NO. : 17/708409
DATED : February 6, 2024
INVENTOR(S) : Schulte et al.

It is certified that error appears in the above-identified patent and that said Letters Patent is hereby corrected as shown below:

In the Specification

Column 5, Line 38, After "5" insert -- µm, --.

Column 14, Line 61, After "5" insert -- µm, --.

Signed and Sealed this
Third Day of September, 2024

Katherine Kelly Vidal
Director of the United States Patent and Trademark Office